(12) United States Patent
Hubby, Jr. et al.

(10) Patent No.: US 6,778,165 B2
(45) Date of Patent: Aug. 17, 2004

(54) PARTICLE DISPLAY DEVICE USING BISTABLE MOLECULAR MONOLAYERS

(75) Inventors: Laurence M. Hubby, Jr., Palo Alto, CA (US); Sean Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

(21) Appl. No.: 09/981,341

(22) Filed: Oct. 15, 2001

(65) Prior Publication Data

US 2003/0071781 A1 Apr. 17, 2003

(51) Int. Cl.⁷ .............................................. G09G 3/34
(52) U.S. Cl. ..................................... 345/107; 359/296
(58) Field of Search .......................... 345/107; 359/296

(56) References Cited

U.S. PATENT DOCUMENTS

| | | | |
|---|---|---|---|
| 3,841,732 A | * 10/1974 | Marks | 359/296 |
| 6,323,989 B1 | 11/2001 | Jacobson et al. | |
| 6,392,786 B1 | * 5/2002 | Albert | 359/296 |
| 6,441,881 B1 | * 8/2002 | Enomoto et al. | 349/156 |
| 6,734,305 B2 | * 5/2004 | Pierre et al. | 544/347 |

FOREIGN PATENT DOCUMENTS

WO    WO 99/53371    10/1999

OTHER PUBLICATIONS

Paul Drzaic et al. "A Printed and Rollable Bistable Electronic Display" SID International Symposium Digest of Technical Papers, US vol. 29 May 17, 1998 pp. 1131–1134.

* cited by examiner

*Primary Examiner*—Alexander Eisen (57) ABSTRACT

A particle display device having a monolayer of a bistable polarizable molecule on either side of a gap filled with a liquid containing suspended particles. The monolayers and the liquid filled gap are disposed between patterned electrodes that are used to apply an electric field across the layers of the gap, thus influencing the orientation or the distribution of the suspended particles. The optical transmission or reflectance of the gap is dependent upon the applied electric field. The polarizable monolayers respond to the applied electric field by assuming one of two stable polarized states. The field provided by the dipoles of the molecules in the monolayer remains after the external field is removed, thereby sustaining the electric field influence on the suspended particles of the display device.

20 Claims, 7 Drawing Sheets

PARTICLE DISPLAY DEVICE USING BISTABLE MOLECULAR MONOLAYERS

BACKGROUND OF THE INVENTION

1. Field of the Invention

This invention relates to display devices. In particular, the invention relates to a structure for maintaining the state of a display device using an induced electric field.

2. Related Art

Flat-Panel Displays (FPDs), which are commonly used in laptop computers and other portable applications require low power consumption and compact size, in addition to good visual display characteristics. One class of technology used for FPDs involves the manipulation of particles that are suspended in a liquid medium to alter the reflective and transmissive properties of the medium.

There are two general types of particle displays, the first is often referred to as a suspended particle display (SPD). In SPDs the orientation of the particles is selectively controlled to produce the optical contrast required for a display. In an electrophoretic image display (EPID) the distribution of a particle population is selectively controlled in order to produce the optical contrast required for a display. In both cases an electric field is used to control the particles. It should be noted that particles in both display types are suspended in a liquid medium, and in one case the response to the electric field is with respect to orientation, and in the other with respect to distribution.

SPDs are attractive due to their wide viewing angle, high optical transmission and ease of fabrication. With SPDs, light valve action is obtained when sub-micron sized particles with an asymmetric, plate-like shape align with an externally-applied electric field, and thus permit light to pass through (the "light" state). This alignment occurs because the external field induces a dipole moment in the molecules of the particles. In the absence of the external field, the particles orient randomly due to brownian motion, and consequently block light (the "dark" state).

For example, crystals of iodoquinine sulfate or related compounds may be dispersed in an organic liquid, and since the crystals are dichroic, there is a large difference between the absorption in the unaligned state in comparison to the aligned state. In the absence of an applied field, the random orientation produces a bluish-black appearance, and in the aligned state there is very little absorption and good contrast can be obtained with a white background. A significant disadvantage of SPDs is that the light areas of the display must be continuously energized with the external electric field to maintain the display, thus consuming energy even when the image on the display is static. SPDs also typically lack a clear voltage threshold, and require active-matrix addressing for high resolution.

In EPIDs, the particles used in the display are electrically charged and may either have a color that contrasts with the liquid used to suspend them, for example white particles in a dark blue dye, or may be divided into particles of two contrasting colors with opposite charge. The particles migrate under the influence of an applied electric field to the front or back of the display, producing a light or dark region when viewed from the front. The EPID operates by reflection and absorption as opposed to transmission. Although EPIDs have inherent memory, there is no voltage threshold, making multiplexed displays difficult.

Thus, the need exists for a particle display that is able to retain a displayed image without an applied external field. There is also a need for a particle display that has a voltage threshold that enables multiplexing.

SUMMARY OF THE INVENTION

A particle display device having a monolayer of a bistable polarizable molecule on either or both sides of a gap filled with a liquid containing suspended particles is disclosed. The monolayers and the liquid filled gap are disposed between patterned electrodes that are used to apply an electric field across the layers of the gap, thus influencing the orientation or the distribution of the suspended particles. The optical transmission or reflectance of the gap is dependent upon the applied electric field. The polarizable monolayers respond to the applied electric field by assuming one of two stable polarized states. The field provided by the dipoles of the molecules in the monolayer remains after the external field is removed, thereby sustaining the electric field influence on the suspended particles of the display device.

In one embodiment of the present invention, an SPD having plate-like or tabular particles suspended in a liquid filled gap between two transparent substrates has a monolayer of a bistable polarizable molecule applied to the surface of each of the substrates. The bistable polarizable molecule has two stable states separated by an electric field threshold, with one state having a higher electric dipole moment than the other, or a reversed dipole. When an external field of sufficient strength is applied across the substrates, the dipoles on opposite sides of the gap are in opposite complementary states and provide an internal field for the device that remains after the external field is removed.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a particle display device using bistable molecular monolayers, numerous specific details are set forth in order to provide a thorough understanding of the present invention. However, it will be obvious to one skilled in the art that the present invention may be practiced without these specific details. In other instances well known processes, procedures, components, and structures have not been described in detail so as not to unnecessarily obscure aspects of the present invention.

Figure 1:
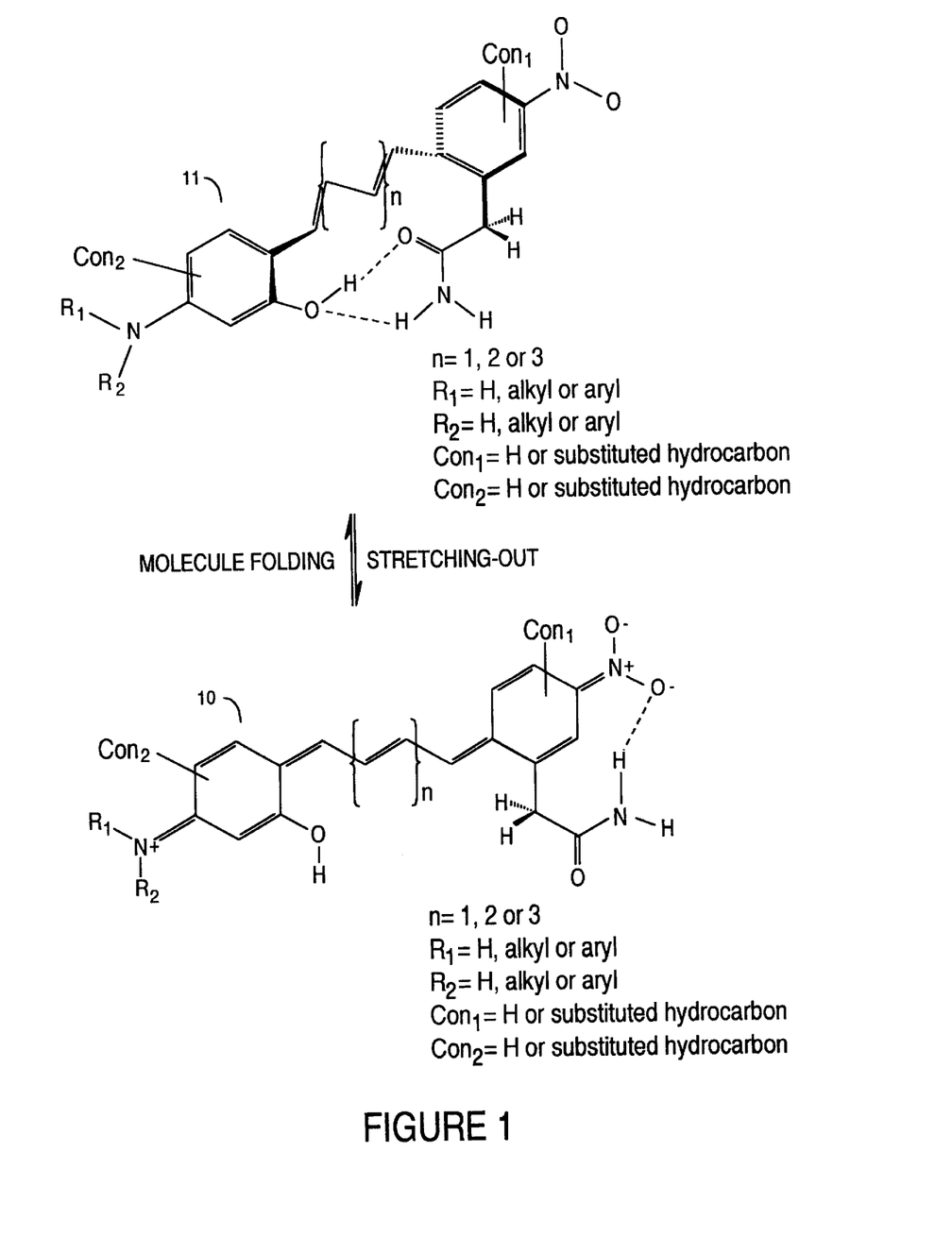
FIG. 1 illustrates a representative molecule having a bistable dipole in accordance with an embodiment of the present claimed invention.

FIG. 1 shows a bistable polarizable molecular species for producing the bistable molecular monolayer of the present invention. $Con_1$ and $Con_2$ are connecting units that provide a site or sites for attaching the molecule to a substrate (e.g, metal electrode, dielectric substrate, etc.). For $Con_1$ and $Con_2$ the substrate bond may be made between a carbon atom in the ring by dehydrogenation, or by substitution of a ring carbon with with an atom such as nitrogen, oxygen, sulfur, silicon, etc. The molecule shown in FIG. 1 meets the following requirements:

a) The molecule must have at least two segments.
b) All segments must have π- and/or p-electrons.
c) The molecule can be either symmetrical or asymmetrical with a donor group on one side and an acceptor group on another side.
d) At least two segments of the molecule have some functional groups that will help to stabilize both states of folding and stretching through intra- or intermolecular forces such as hydrogen bonding, Van der Waals forces, coulomb attraction or metal complex.
e) The folding or stretching states of the molecule must be e-field addressable.
f) At least in one state (presumably on a fully stretched-out state), the π- and/or p-electrons of the molecule will be well delocalized, and the π- and/or p-electrons of the molecule will be localized or only partially delocalized in other state(s).

In FIG. 1, the stretched-out configuration 10 of the molecule arises in response to an external field of sufficient strength. In this configuration, the whole molecule is in a perfect planar conformation and the π- and/or p-electrons delocalized through the entire molecule. Because of the extended conjugation (π- and/or p-electrons delocalization) of the molecule makes participation of the donor ($R_1R_2N$—) and the acceptor (Nitro group) to the polarization of the molecule possible, the molecular dipole is greatly increased.

When in the folded configuration 11 of FIG. 1, the molecule is nonplanar, and the extended conjugation (π- and/or p-electrons delocalization) is cut off. In this state, there is no participation from the donor ($R_1R_2N$—) and the acceptor (Nitro group) in polarization, that is, the route between donor ($R_1R_2N$—) and acceptor (Nitro group) is cut off, and the dipole of the molecule is greatly reduced.

Figure 2:
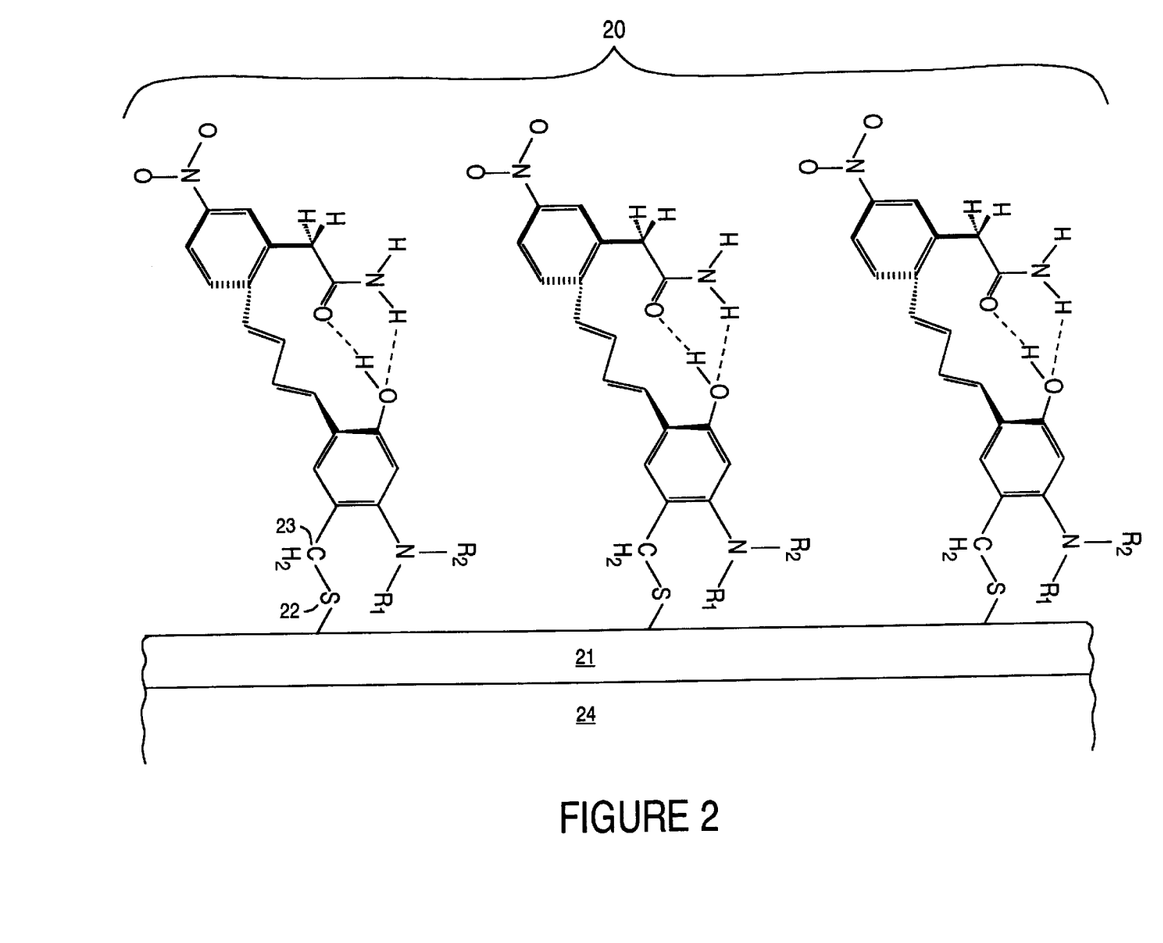
FIG. 2 shows a bistable molecular monolayer on a conductive film in accordance with an embodiment of the present claimed invention.

FIG. 2 shows a bistable molecular monolayer 20 on a conductive film 21 in accordance with an embodiment of the present claimed invention. In this example, a sulfur atom 22 is shown as a bridge between a terminal carbon atom 23 and the surface of the conductive film 21. The conductive film 21 is supported by a substrate 24.

For particle display devices, the front substrate is transparent for both transmissive and reflective devices, and the conductive film may be either a transparent conductive oxide (e.g. doped indium or tin oxide or ruthenium oxide), or a thin metal film. For thin metal films, a stable metal such as gold or a platinum group metal is preferred. Since the metal film must be very thin to provide transparency, chemical stability is desirable.

The fabrication of a molecular monolayer on a gold film can be accomplished by using a molecule having thiol functional group (S—H) on one end. The monolayer can be assembled from solution or by vapor deposition. The process may be performed in a two step sequence in which the species are first physisorbed on the substrate and then mildly heated to produce the sulfur-gold bond, with the chemisorbed species being more tightly bound than the physisorbed species. Alkanethiols, having a linear carbon chain terminated with a thiol group may serve as the binding end of a bistable molecule, with functional groups being added to binding group to provide the required electronic properties for the molecule as a whole.

For a reflective particle display such as an EPID, transparency is not required for the back substrate, and a thicker metal film may be used. The ability to use a thicker film provides more flexibility in the selection of the metal used and the species used to bond to the metal film.

Figure 3:
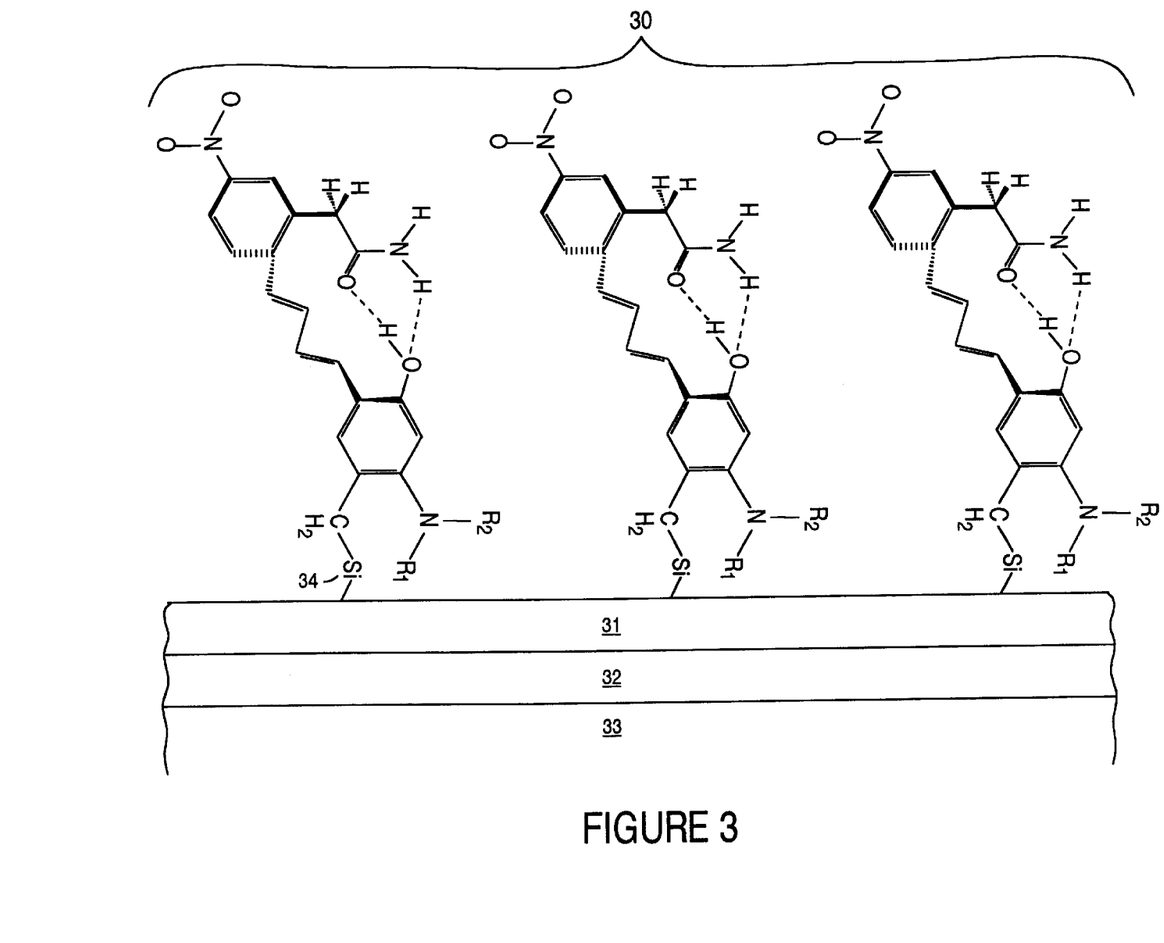
FIG. 3 shows a bistable molecular monolayer on a dielectric film in accordance with an embodiment of the present claimed invention.

FIG. 3 shows an alternative structure for supporting the bistable molecular monolayer of the present invention. In this example, the monolayer 30 is deposited on a dielectric film 31 that is used as an overcoating for a conductive film 32. the dielectric film 31 and the conductive film 32 are supported by a substrate 33. The dielectric film 31 may be used to prevent undesirable charge transfer leading to electrochemical reactions. A preferred material for the dielectric film 31 is silicon dioxide. Since the monolayer of FIG. 3 is bonded to an oxide, a silicon atom 34 replaces the sulfur atom of FIG. 2 as the bridge between the terminal carbon and the surface of the dielectric film 31. The silicon atom is typically provided on the molecular species as a silane (Si—H) or silanol (Si—O—H) group. The silicon functional group may also be used to bond to the surface of the previously mentioned transparent conductive oxide film that may be used in place of a conductive metal film.

Figure 4:
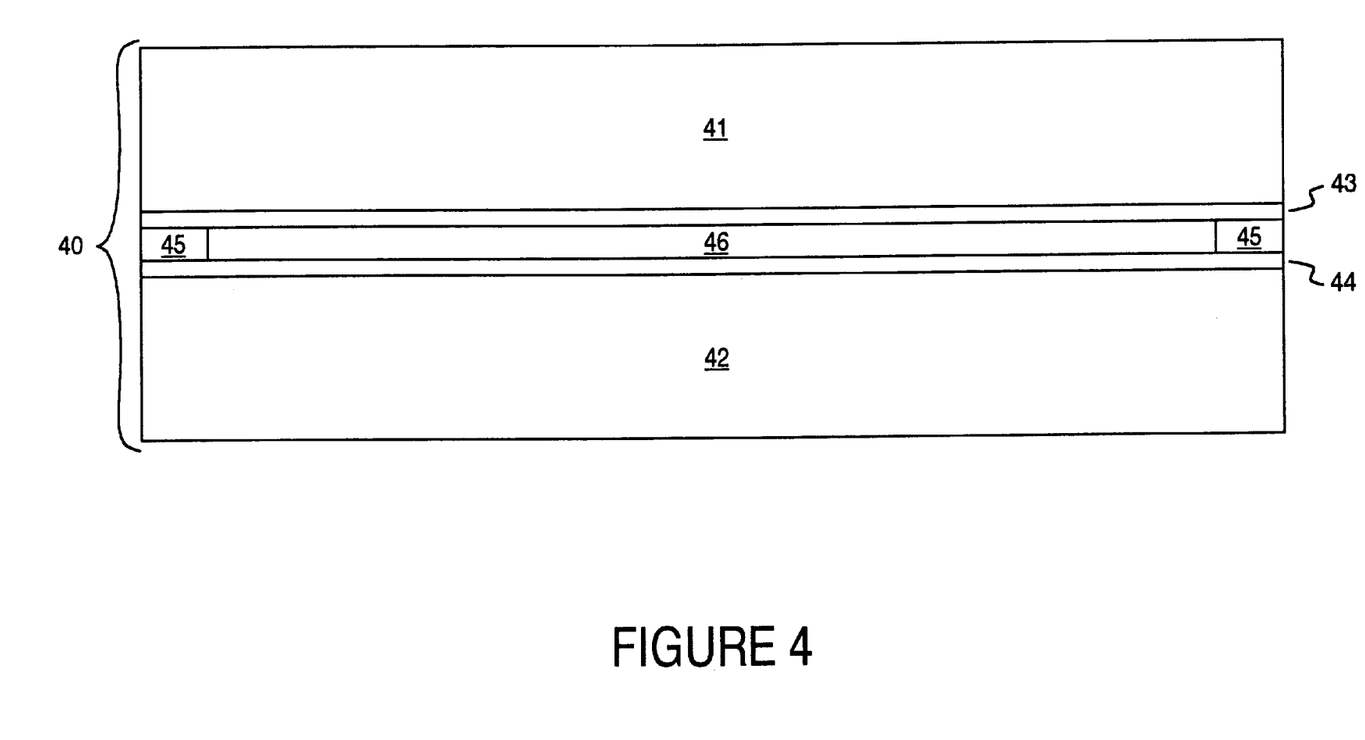
FIG. 4 shows a suspended particle display structure for use with the bistable molecular monolayer in accordance with an embodiment of the present claimed invention.

FIG. 4 shows a typical suspended particle display structure 40 that can be used with the present invention. A top substrate 41 and a bottom substrate 42 provide support for a top conductive coating 43 and a bottom conductive coating 44, respectively. The top substrate 41 and the top conductive coating 43 are transparent. The bottom substrate 42 and the bottom conductive coating 44 may be either transparent as in the case of a SPD, or non-transparent as in the case of an EPID. The transparent materials suitable for use as the top substrate 41 are organic polymers, glass, and crystalline materials such as sapphire and quartz. The suitable materials for the bottom substrate include those for use in the top substrate 41 as well as other opaque dielectric materials.

As shown in FIG. 4, the substrates are separated by a gap 46 and sealed along the perimeter by a seal 45. The gap 46 is filled with a liquid containing suspended particles. The properties of the liquid and particles are dependent upon the operational characteristics desired in the display.

Figure 5:
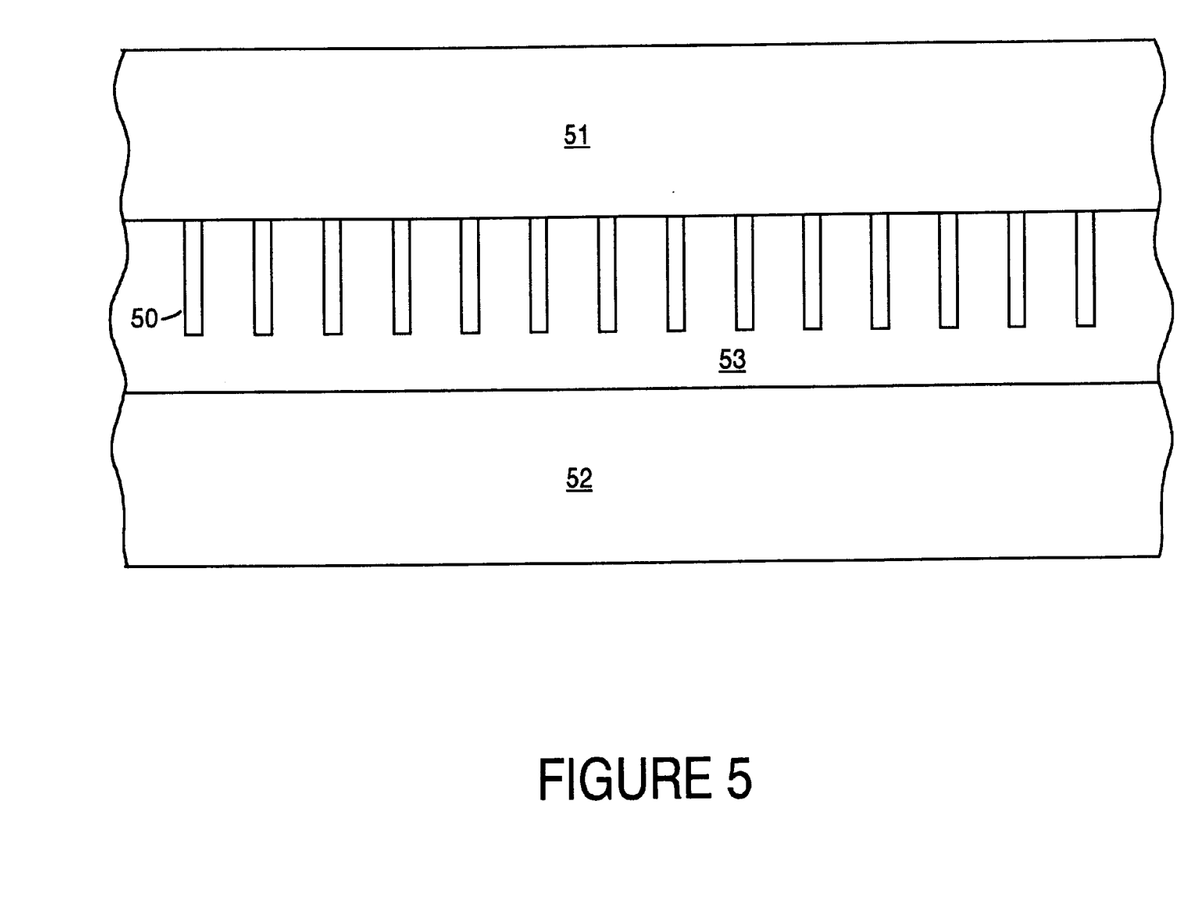
FIG. 5 shows a schematic of a display using aligned tabular particles in accordance with an embodiment of the present claimed invention.

FIG. 5 shows a schematic closeup of the display of FIG. 4 with aligned tabular particles 50, such as those used in a SPD, suspended in the gap between the substrates 51 and 52 in a transparent liquid medium 53. The tabular particles are flat with a shape that can be approximated by a regular polygon. The shape of the particles allows for the maximum transmission of light through the gap when the particles are aligned with the electric field. In the absence of an electric field, the particles are randomly oriented and the transmission is reduced. The contrast between the aligned and random orientations is a function of the properties of the materials in the optical path, and the number and distribution of the particles. Ideally, the index of refraction of the substrate and coatings is well matched to the suspending liquid, and poorly matched to the particles.

Figure 6:
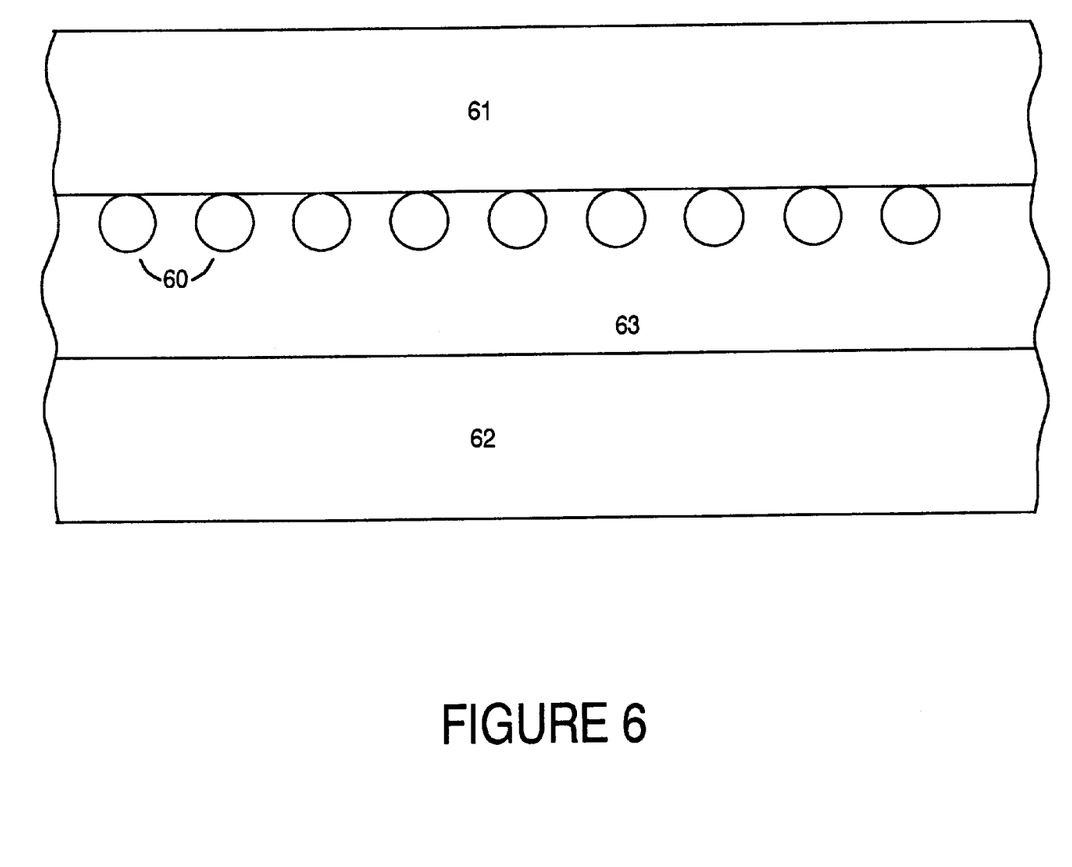
FIG. 6 shows a schematic of a display using a homogeneous population of aligned spherical particles in accordance with an embodiment of the present claimed invention.

FIG. 6 shows a schematic closeup of the display of FIG. 4 with spherical particles 60, such as those used in an EPID, suspended in the gap between the substrates 61 and 62 in an opaque liquid medium 63. The particles 60 have the same charge and will migrate to either the top substrate 61 or the bottom substrate 62 in response to an applied field, depending on the polarity of the charge and the direction of the applied field. The charge on the particles may be produced an interaction with the liquid medium 63 or by an electret process, or dielectric absorption.

The suspended particles 60 and the liquid medium 63 have contrasting colors, for example, the particles 60 may be white and the liquid medium 63 a dark blue. In FIG. 6, the particles 60 are shown positioned on the top substrate 61. In regions having this distribution, the display will appear light due to reflection from the particles 60. A reversal in polarity causes the particles 60 to migrate to the bottom surface 62, making the display appear dark due to absorption by the liquid medium 63.

Figure 7:
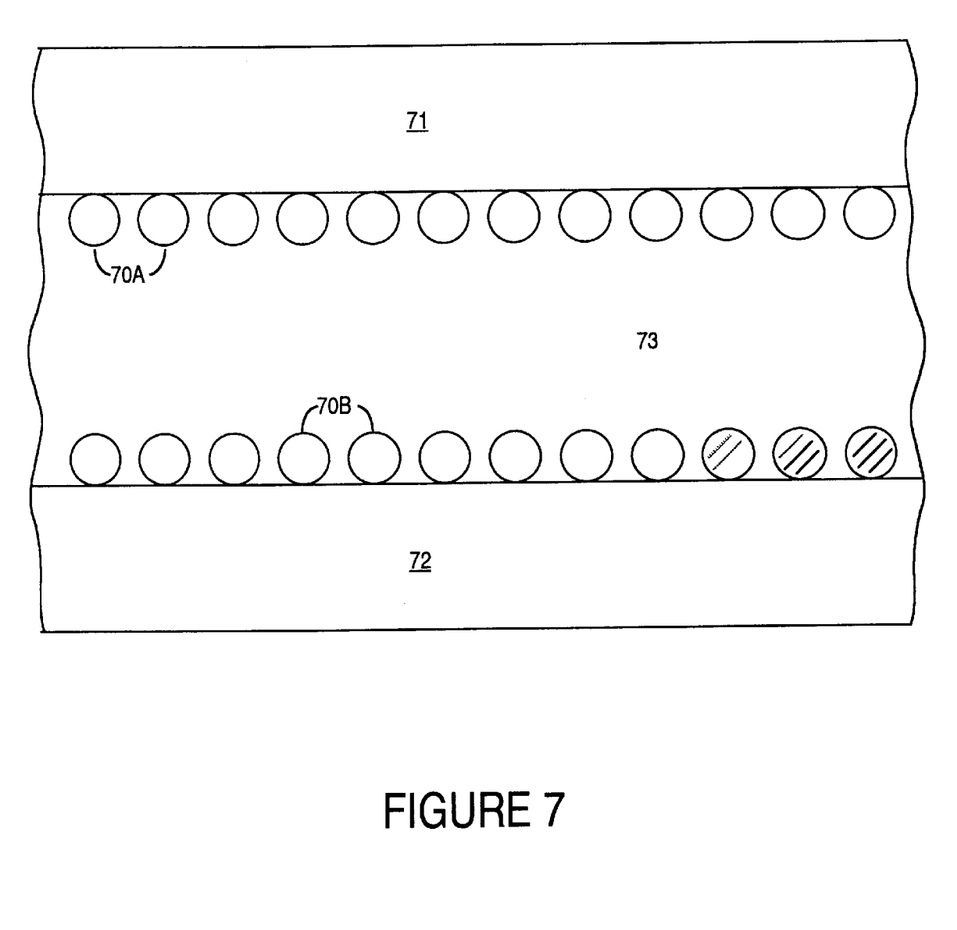
FIG. 7 shows a schematic of a display using a heterogeneous population of aligned spherical particles in accordance with an embodiment of the present claimed invention.

FIG. 7 shows a schematic closeup of a display similar to that of FIG. 6, having a heterogeneous population of spherical particles, suspended in the gap between the substrates 71 and 72 in a liquid medium 73. The population of particles is composed of two groups of particles 70A and 70B having contrasting colors and opposite charge.

Since the two groups of particles 70A and 70B have opposite charge, they will migrate to opposite substrates in the presence of an applied electric field. Depending upon the field orientation in a given region of the display, one group or the other will be resident on the surface of the substrate being viewed and the other will be obscured. The liquid medium 73 may be either transparent or opaque.

Since the field produced by the bistable molecular monolayers is a DC field, it is important that the particles be prevented from agglomerating or "plating out" in response to the field. In addition to the monolayers that are tailored for the substrate surfaces, monolayers or partial layers of molecules designed to provide steric hindrance may be used on the particle surfaces to prevent irreversible binding of the particles to the bistable molecular monolayers, or to each other. The charge associated with the particles used in an EPID will help prevent agglomeration in an EPI; however, the particles in a SPD are not typically charged, and may require the assistance of steric hindrance to prevent Van der Waals forces from becoming strong enough to resist the electrostatic forces that enable operation of the display device.

In order to serve as a standoff, the molecule providing steric hindrance must be able to inhibit close approach between particles and the bistable molecular monolayer so that the radius of approach does not become small enough to allow Van der Waals forces to dominate.

The preferred embodiment of the present invention, a particle display device using bistable molecular monolayers, is thus described. While the present invention has been described in particular embodiments, it should be appreciated that the present invention should not be construed as limited by such embodiments, but rather construed according to the below claims.

What is claimed is:

1. A display device comprising:
   a first transparent substrate comprising a surface partially covered with a first transparent electrically conductive film, having a portion coated with a first bistable molecular monolayer;
   a second transparent substrate comprising a surface partially covered with a second transparent electrically conductive film, having a portion coated with a second bistable molecular monolayer, wherein said first transparent substrate is disposed opposite and substantially parallel to said second transparent substrate, such that a gap is formed between said first bistable molecular monolayer and said second bistable molecular monolayer;
   a liquid disposed in said gap, comprising suspended particles responsive to an electric field, such that the optical transmission of said display device is dependent upon the electrical polarization of said first and second bistable molecular monolayers.

2. The display device of claim 1, wherein said first transparent electrically conductive film is a metal film.

3. The display device of claim 2, wherein said metal is selected from the group consisting of: platinum, palladium, rhodium, ruthenium, iridium, osmium and gold.

4. The display device of claim 3, wherein said metal is gold.

5. The display device of claim 1, wherein said bistable molecular monolayer is formed from molecules having a functional group including sulfur.

6. The display device of claim 1, wherein said first conductive film is an oxide.

7. The display device of claim 6, wherein the oxide comprises a metal selected from the group consisting of: indium, tin, and ruthenium.

8. The display device of claim 6, wherein said bistable molecular monolayer is formed from molecules having a functional group including silicon.

9. A display device comprising:
   a first transparent substrate having a surface partially covered with a transparent first electrically conductive film, wherein a portion of said first electrically conductive film is coated with a first bistable molecular monolayer;
   a second substrate having a surface partially covered with a second electrically conductive film, wherein a portion of said second electrically conductive film is coated with a second bistable molecular monolayer, wherein said first substrate is disposed opposite and substantially parallel to said second substrate, such that a gap is formed between said first bistable molecular monolayer and said second bistable molecular monolayer;
   a liquid disposed in said gap, said liquid containing suspended particles responsive to an electric field, such that the optical reflectance of said display device is dependent upon the polarization of said first and second bistable molecular monolayers.

10. The display device of claim 1, wherein said first transparent electrically conductive film is a metal film.

11. The display device of claim 2, wherein said metal is selected from the group consisting of: platinum, palladium, rhodium, ruthenium, iridium, osmium and gold.

12. The display device of claim 9, wherein said bistable molecular monolayer is formed from molecules having a functional group including sulfur.

13. The display device of claim 9, wherein said first conductive film is an oxide.

14. The display device of claim 13, wherein the oxide comprises a metal selected from the group consisting of: indium, tin, and ruthenium.

15. The display device of claim 13, wherein said bistable molecular monolayer is formed from molecules having a functional group including silicon.

16. A display device comprising:
   a first substrate having a surface partially covered with a first electrically conductive film, wherein a portion of said first electrically conductive film is coated with a first bistable molecular monolayer;

a second substrate having a surface partially covered with a second electrically conductive film, wherein a portion of said second electrically conductive film is coated with a second bistable molecular monolayer, wherein said first substrate is disposed opposite and substantially parallel to said second substrate, such that a gap is formed between said first bistable molecular monolayer and said second bistable molecular monolayer;

a liquid disposed in said gap, said liquid containing suspended particles responsive to an electric field.

17. The display device of claim 16, wherein said suspended particles are of a tabular form.

18. The display device of claim 16, wherein said suspended particles have a coating of molecules providing steric hindrance with respect to the bistable molecular monolayers.

19. The display device of claim 16 wherein said suspended particles have a net electrical charge.

20. The display device of claim 16, wherein said suspended particles are approximately spherical in shape.

* * * * *